US010791475B2

(12) United States Patent
Imanilov

(10) Patent No.: US 10,791,475 B2
(45) Date of Patent: Sep. 29, 2020

(54) SYSTEMS AND METHODS FOR PERFORMANCE EVALUATIONS IN DISTRIBUTED ANTENNA SYSTEMS (DASS)

(71) Applicant: Corning Optical Communications LLC, Charlotte, NC (US)

(72) Inventor: Benjamin Imanilov, Hod Hasharon (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/181,390

(22) Filed: Nov. 6, 2018

(65) Prior Publication Data

US 2020/0145861 A1 May 7, 2020

(51) Int. Cl.
*H04W 24/10* (2009.01)
*H04W 88/08* (2009.01)

(52) U.S. Cl.
CPC .......... *H04W 24/10* (2013.01); *H04W 88/085* (2013.01)

(58) Field of Classification Search
None
See application file for complete search history.

(56) References Cited

U.S. PATENT DOCUMENTS

| 9,668,151 | B2 | 5/2017 | Elliott et al. | |
|---|---|---|---|---|
| 2012/0039254 | A1* | 2/2012 | Stapleton | H03F 1/3247 370/328 |
| 2013/0260705 | A1* | 10/2013 | Stratford | H04B 17/12 455/226.1 |
| 2017/0064722 | A1 | 3/2017 | Tarlazzi et al. | |

* cited by examiner

*Primary Examiner* — Anh Ngoc M Nguyen
(74) *Attorney, Agent, or Firm* — C. Keith Montgomery

(57) ABSTRACT

Systems and methods for performance evaluations in distributed antenna systems (DAS) allow certain ones of remote radio units (RRUs) (note that the RRUs may also be referred to as a remote antenna unit (RAU)) within a DAS to emulate user equipment and send test signals to other RRUs. The other RRUs may report these signals to a management device for analysis and determination as to whether service of a desired level is provided. Further, the emulator RRU may also receive test signals from the other RRUs and report such signals to the management device for evaluation. Based on these evaluations, the adequacy of the placement of the RRUs relative to a desired standard may be determined and adjustments recommended.

10 Claims, 11 Drawing Sheets

SYSTEMS AND METHODS FOR PERFORMANCE EVALUATIONS IN DISTRIBUTED ANTENNA SYSTEMS (DASS)

BACKGROUND

The disclosure relates generally to distributed communication systems (DCSs), which may include distributed antenna systems (DASs) and, more particularly, for mapping performance evaluations of such DCSs.

Wireless customers are increasingly demanding wireless communication services, such as cellular communication services and Wireless Fidelity (Wi-Fi) services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote antenna units (RAUs) configured to receive and transmit communication signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a wireless distributed communications system (WDCS) 100 that is configured to distribute communication services to remote coverage areas 102(1)-102(N), where 'N' is the number of remote coverage areas. The WDCS 100 in FIG. 1 is provided in the form of a DAS 104. The DAS 104 can be configured to support a variety of communication services that can include cellular communication services, wireless communication services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communication signals 112D from the source transceiver 110 to be distributed to the RAUs 106(1)-106(N). The downlink communication signals 112D can include data communication signals and/or communication signaling signals, as examples. The central unit 108 is configured with filtering circuits and/or other signal processing circuits that are configured to support a specific number of communication services in a particular frequency bandwidth (i.e., frequency communication bands). The downlink communication signals 112D are communicated by the central unit 108 over a communication link 114 over their frequency to the RAUs 106(1)-106(N).

With continuing reference to FIG. 1, the RAUs 106(1)-106(N) are configured to receive the downlink communication signals 112D from the central unit 108 over the communication link 114. The downlink communication signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communication services (i.e., frequency communication bands) supported by the central unit 108. In a non-limiting example, the communication link 114 may be a wired communication link, a wireless communication link, or an optical fiber-based communication link. Each of the RAUs 106(1)-106(N) may include an RF transmitter/receiver 116(1)-116(N) and a respective antenna 118(1)-118(N) operably connected to the RF transmitter/receiver 116(1)-116(N) to wirelessly distribute the communication services to user equipment (UE) 120 within the respective remote coverage areas 102(1)-102(N). The RAUs 106(1)-106(N) are also configured to receive uplink communication signals 112U from the UE 120 in the respective remote coverage areas 102(1)-102(N) to be distributed to the source transceiver 110.

Because the RAUs 106(1)-106(N) include components that require power to operate, such as the RF transmitters/receivers 116(1)-116(N) for example, it is necessary to provide power to the RAUs 106(1)-106(N). In one example, each RAU 106(1)-106(N) may receive power from a local power source. In another example, the RAUs 106(1)-106(N) may be powered remotely from a remote power source(s). For example, the central unit 108 may include a power source 122 that is configured to remotely supply power over the communication link 114 to the RAUs 106(1)-106(N). For example, the communication link 114 may be a cable that includes electrical conductors for carrying current (e.g., direct current (DC)) to the RAUs 106(1)-106(N). If the WDCS 100 is an optical fiber-based WDCS in which the communication link 114 includes optical fibers, the communication link 114 may be a "hybrid" cable that includes optical fibers for carrying the downlink and uplink communication signals 112D, 112U and separate electrical conductors for carrying current to the RAUs 106(1)-106(N).

When a DAS such as the DAS 104 is initially designed, the designers may model expected building parameters such as wall placement and customer traffic patterns to make an initial estimate as to likely usage, performance minimums, and bandwidth requirements. From these initial estimates, the designers may determine an initial placement of the RAUs 106(1)-106(N). Subsequent to installation, a "walk-through" test may be performed in which the DAS 104 is placed into operation and its performance evaluated with actual UE 120 or a test device that emulates the UE 120. The results of this walk-through test may then be used to modify the DAS 104 (e.g., moving a particular RAU 106, adding more RAUs, or the like) so as to provide a desired level of service.

In a perfect world, the initial walk-through test would be sufficient for the life of the DAS 104. However, the real world is not static. The layout and/or use of rooms within the building may change and/or traffic patterns within the building may change. For example, a laboratory which had low wireless demand may be converted to a break room which has higher wireless demand. An occasional walk-through test may be performed to verify that the current layout of the DAS 104 meets the demands, and if not, the building owners may reposition and/or add/subtract RAU 106(1)-106(N) to address the changed demand. In many instances, a new walk-through test may be needed to confirm that the changes adequately address the changed demand. It should be appreciated that such walk-through tests are time and labor intensive.

No admission is made that any reference cited herein constitutes prior art. Applicant expressly reserves the right to challenge the accuracy and pertinency of any cited documents.

SUMMARY

Embodiments of the disclosure relate to systems and methods for performance evaluations in distributed antenna systems (DASs). In one exemplary aspect, a method of testing performance for a distributed communication system (DCS) is disclosed. The method includes designating a first remote radio unit (RRU) in the DCS as an emulator RRU. The method also includes sending a signal through a second RRU to the emulator RRU. The method also includes reporting information about the signal from the emulator RRU to testing equipment.

An additional embodiment of the disclosure relates to a method of testing performance for a DCS. The method includes designating a first RRU in the DCS as an emulator RRU. The method also includes sending a signal through the emulator RRU to a second RRU. The method also includes reporting information about the signal from the second RRU to testing equipment.

An additional embodiment of the disclosure relates to a DCS. The DCS includes a digital routing unit (DRU) configured to be communicatively coupled to a base station and testing equipment. The DCS also includes a first RRU configured by the testing equipment to act as an emulator RRU. The first RRU is communicatively coupled to the DRU. The DCS also includes a second RRU communicatively coupled to the DRU. The second RRU is configured to send signals to the emulator RRU and receive signals from the emulator RRU. The DRU reports information to the testing equipment related to the signals between the emulator RRU and the second RRU.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to systems and methods for performance evaluations in distributed antenna systems (DASs). In particular, exemplary aspects of the present disclosure allow certain ones of remote radio units (RRUs) (note that the RRUs may also be referred to as a remote antenna unit (RAU)) within a DAS to emulate user equipment and send test signals to other RRUs. The other RRUs may report these signals to a management device for analysis and determination as to whether service of a desired level is provided. Further, the emulator RRU may also receive test signals from the other RRUs and report such signals to the management device for evaluation. Based on these evaluations, the adequacy of the placement of the RRUs relative to a desired standard may be determined and adjustments recommended. By using the RRUs in this manner, a time-consuming walk-through test may be avoided. Further, the testing may be done at almost any time, so changes to the building topology or the traffic patterns may be addressed readily.

Figure 1:
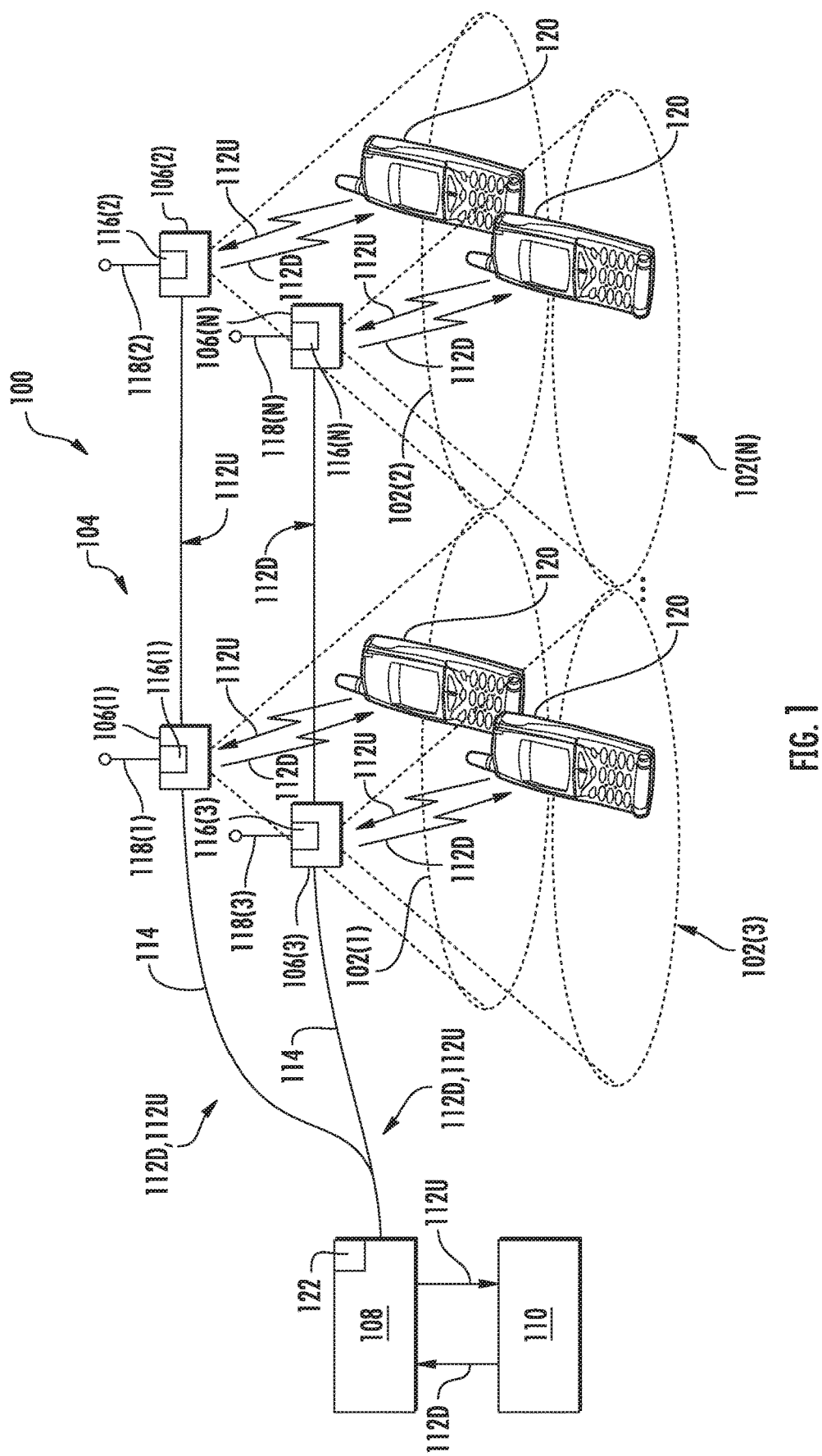
FIG. 1 is a schematic diagram of an exemplary wireless distributed communications system (DCS) in the form of a distributed antenna system (DAS)
Figure 2:
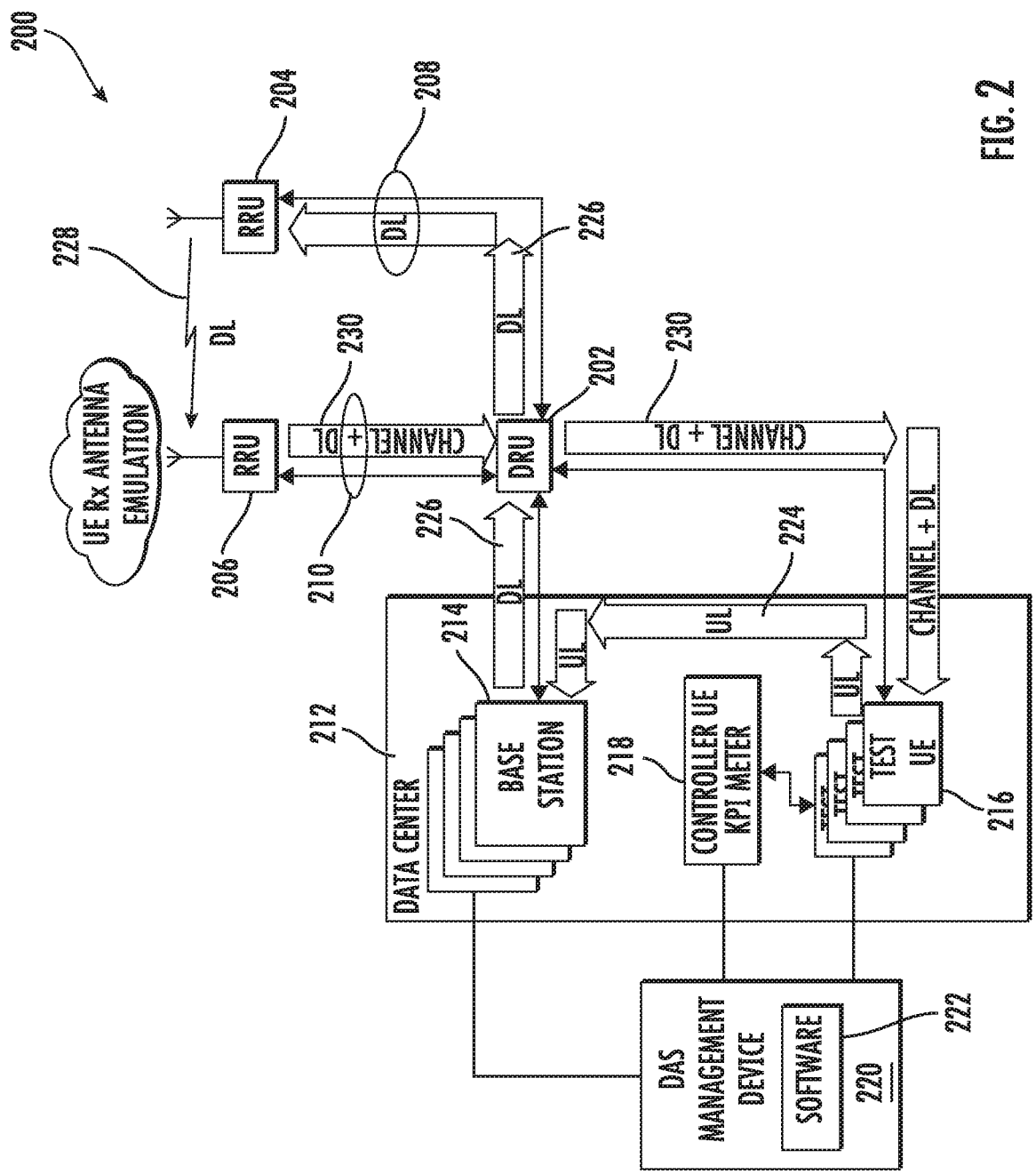
FIG. 2 is a simplified block diagram of a DAS doing downlink performance testing without requiring user equipment.
Figure 3:
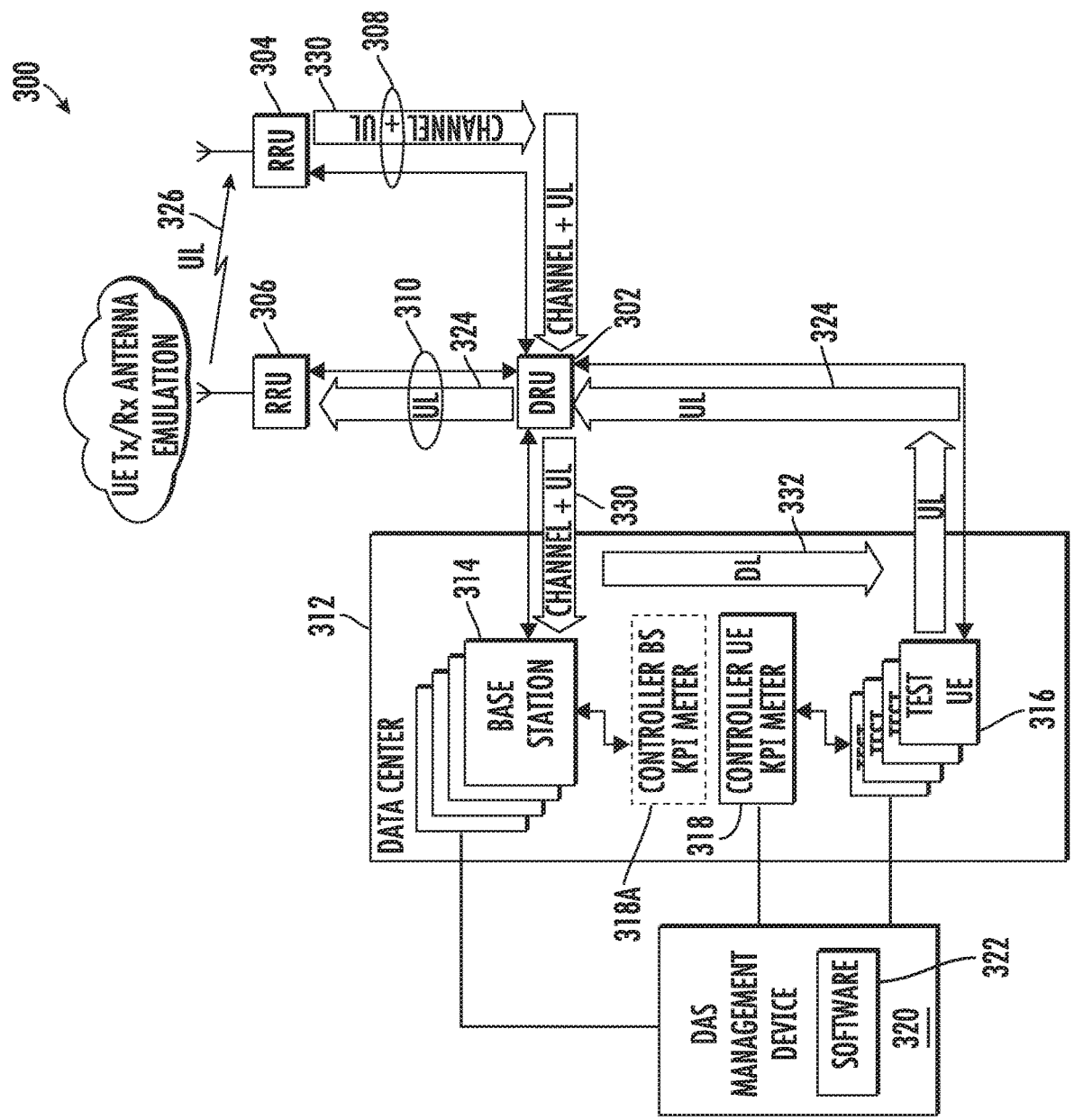
FIG. 3 is a simplified block diagram of a DAS doing uplink performance testing without requiring user equipment.

In this regard, FIGS. 2 and 3 illustrate unidirectional testing, with FIG. 2 illustrating a system 200 for testing a downlink (e.g., network to user equipment) direction and FIG. 3 illustrating a system 300 for testing an uplink (e.g. user equipment to network) direction. In this regard, the system 200 of FIG. 2 includes a central unit, referred to herein as a digital routing unit (DRU) 202 coupled to an RRU 204 and an emulator RRU 206 through respective connective communication cables 208 and 210. The DRU 202 is communicatively coupled to a data center 212 that may include a base station 214 (or plural base stations), testing equipment 216 (or plural testing devices), and a Key Performance Indicator (KPI) meter 218. The KPI meter 218 and/or the testing equipment 216 may be communicatively coupled to a DAS management device 220 having software 222 thereon for managing aspects of the present disclosure. The DAS management device 220 may, in addition to managing aspects of the present disclosure, also manage other aspects of the DAS, such as routing configurations, maintenance including assignment of specific RRUs to specific base stations and commanding the DRU 202 regarding required routing. The DAS management device 220 may communicate with the base station(s) 214 and the testing equipment 216 as well as the KPI meter 218. As part of these management and maintenance functions, appropriate control signals may be sent from the DAS management device 220 to the RRUs that are routed by the DRU 202.

It should be appreciated, although it is not required, that the software 222 may coordinate all the testing done and thus coordinate between the base station(s) 214 and the testing equipment 216. In some implementations, the coordination may be made more efficient by the software 222 knowing the state of the base station(s) 214 and the testing equipment 216. In some implementations, such knowledge may extend to control over the base station(s) 214 to facilitate real time requests and scheduling of testing.

With continued reference to FIG. 2, the DAS management device 220 causes the testing equipment 216 to send a signal 224 (also labeled UL in FIG. 2) to the base station 214, which sends a downlink signal 226 to the DRU 202. The DRU 202 passes the downlink signal 226 to the RRU 204, which transmits the information in the downlink signal 226 wirelessly as signal 228 to the emulator RRU 206. The RRU 204 treats the emulator RRU 206 as user equipment in this regard. The emulator RRU 206 reports channel measurements and the original downlink signal (collectively noted as signal 230 in FIG. 2) to the DRU 202. The DRU 202 passes the signal 230 to the testing equipment 216, which may, with the KPI meter 218, determine the effective strength of signal, coverage areas, error levels, and the like. A more detailed list is provided below. In this manner, the emulator RRU 206 acts like user equipment to receive signals from at least one other RRU 204. It should be appreciated that multiple RRUs (not shown) may operate to send signals to the emulator RRU 206. Likewise, the RRU 204 and the emulator RRU 206 may switch roles with the RRU 204 acting as an emulator RRU, and the emulator RRU 206 acting to send downlink signals to the RRU 204. By rotating through which RRU within the system 200 is the emulator RRU 206, the entirety of the system 200 may be tested without having to perform a walk-through test. Such testing may allow the system 200 to be evaluated in view of changes to building topology or traffic patterns.

When testing for effective signal strength, error levels, and the like, a few metrics are well established for traditional walk through tests and may be used by exemplary aspects of the present disclosure. In this regard, measurements that are taken by UE and Base Station at Physical Layer could be used as metrics. Moreover, KPI per area and globally may be used to have a full and detailed picture regarding current system state and performance. Exemplary KPI for regular system operation and for walk test include: initial UE attach success rate (default bearer setup); link request success rate (dedicated bearer setup); initialization Voice Over Internet Protocol (VOIP) call success rate; initialization Data call success rate; fallback to 3G/2G success rate; VOIP call drop rate; data call drop rate; handover success and/or request rate and/or ratio success/request; DL/UL mean user throughput; DL/UL overall iC-RAN traffic. Further metrics include those described at 36.214 for LTE and at 38.215 for 5G could/should be considered as metrics: SS Reference Signal Received Power (SS-RSRP); Channel State Information (CSI) Reference Signal Received Power (CSI-RSRP); SS Reference Signal Received Quality (SS-RSRQ); CSI Reference Signal Received Quality (CSI-RSRQ); SS signal-to-noise and interference ratio (SS-SINR); CSI signal-to-noise and interference ratio (CSI-SINR); UE GNSS Timing of Cell Frames for UE positioning for E-UTRAN; UE GNSS code measurements; UE GNSS carrier phase measurements; IEEE 802.11 WLAN RSSI; Reference Signal Time Difference (RSTD) for E-UTRAN; SFN and Frame Timing Difference (SFTD); E-UTRA RSRP; E-UTRA RSRQ; E-UTRA RS-SINR; SS Reference Signal Received Power per Branch (SS-RSRPB); SSS transmit power; UTRA FDD CPICH RSCP; UTRA FDD carrier RSSI; UTRA FDD CPICH Ec/No; GSM carrier RSSI; UTRA TDD P-CCPCH RSCP; CDMA2000 1×RTT Pilot Strength; CDMA2000 HRPD Pilot Strength; Reference Signal Time Difference (RSTD); UE Rx-Tx time difference; MBSFN Reference Signal Received Power (MBSFN RSRP); MBSFN Reference Signal Received Quality (MBSFN RSRQ); Multicast Channel Block Error Rate (MCH BLER); Sidelink Reference Signal Received Power (S-RSRP); Sidelink Discovery Reference Signal Received Power (SD-RSRP); Reference Signal-signal to noise and interference ratio (RS-SINR); Received Signal Strength Indicator (RSSI); SFN and Subframe Timing Difference (SSTD); Narrowband Reference Signal Received Power (NRSRP); Narrowband Reference Signal Received Quality (NRSRQ); Sidelink Received Signal Strength Indicator (S-RSSI); PSSCH Reference Signal Received Power (PSSCH-RSRP); Channel Busy Ratio (CBR); Channel occupancy ratio (CR); SFN and Frame Timing Difference (SFTD); DL RS TX power; Received Interference Power; Thermal noise power; Timing advance (TADV); eNB Rx-Tx time difference; Angle of Arrival (AoA); and UL Relative Time of Arrival (TUL-RTOA).

Similarly, the system 300 of FIG. 3 may be used to test uplink signals. In this regard, the system 300 includes a central unit, referred to herein as a DRU 302 coupled to a RRU 304 and an emulator RRU 306 through respective connective communication cables 308 and 310. The DRU 302 is communicatively coupled to a data center 312 that may include a base station 314 (or plural base stations), testing equipment 316 (or plural testing devices), and a KPI meter 318. A second KPI meter 318A may be present and associated with the base station 314. The KPI meter 318 and/or the testing equipment 316 may be communicatively coupled to a DAS management device 320 having software 322 thereon for managing aspects of the present disclosure. The DAS management device 320 may perform many or all of the functions of the DAS management device 220 of FIG. 2. The DAS management device 320 may communicate with the base station(s) 314 and the testing equipment 316 as well as the KPI meter 318. As part of these management and maintenance functions, appropriate control signals may be sent from the DAS management device 320 to the RRUs that are routed by the DRU 302.

With continued reference to FIG. 3, the DAS management device 320 causes the testing equipment 316 to send a signal 324 (also labeled UL in FIG. 3) to the DRU 302. The DRU 302 passes the signal 324 to the emulator RRU 306, which transmits the information in the uplink signal 324 wirelessly as signal 326 to the RRU 304. The RRU 304 reports channel measurements and the original uplink signal (collectively noted as signal 330 in FIG. 3) to the DRU 302. The DRU 302 passes the signal 330 to the base station 314, which may pass the contents of the signal 330 to the testing equipment 316 (noted generally as signal 332). The testing equipment 316 with the KPI meter 318 determines the effective strength of signal, error levels, and the like. Alternatively, the base station 314 may use the optional second KPI meter 318A to determine the effective strength of signal, error levels, and the like. In this latter case, the signal 332 may be the output from such determination. In this manner, the emulator RRU 306 acts like user equipment to send signals to at least one other RRU 304. It should be appreciated that multiple RRUs (not shown) may operate to receive signals from the emulator RRU 306. Likewise, the RRU 304 and the emulator RRU 306 may switch roles with the RRU 304 acting as an emulator RRU to send signals to the (emulator) RRU 306. By rotating through which RRU within the system 300 is the emulator RRU 306, the entirety of the system 300 may be tested without having to perform a walk-through test. Such testing may allow the system 300 to be evaluated in view of changes to building topology or traffic patterns.

Note that the system 200 and the system 300 are not mutually exclusive, and a given system may initially test downlink signals and then test uplink signals (or vice versa).

Figure 4A:
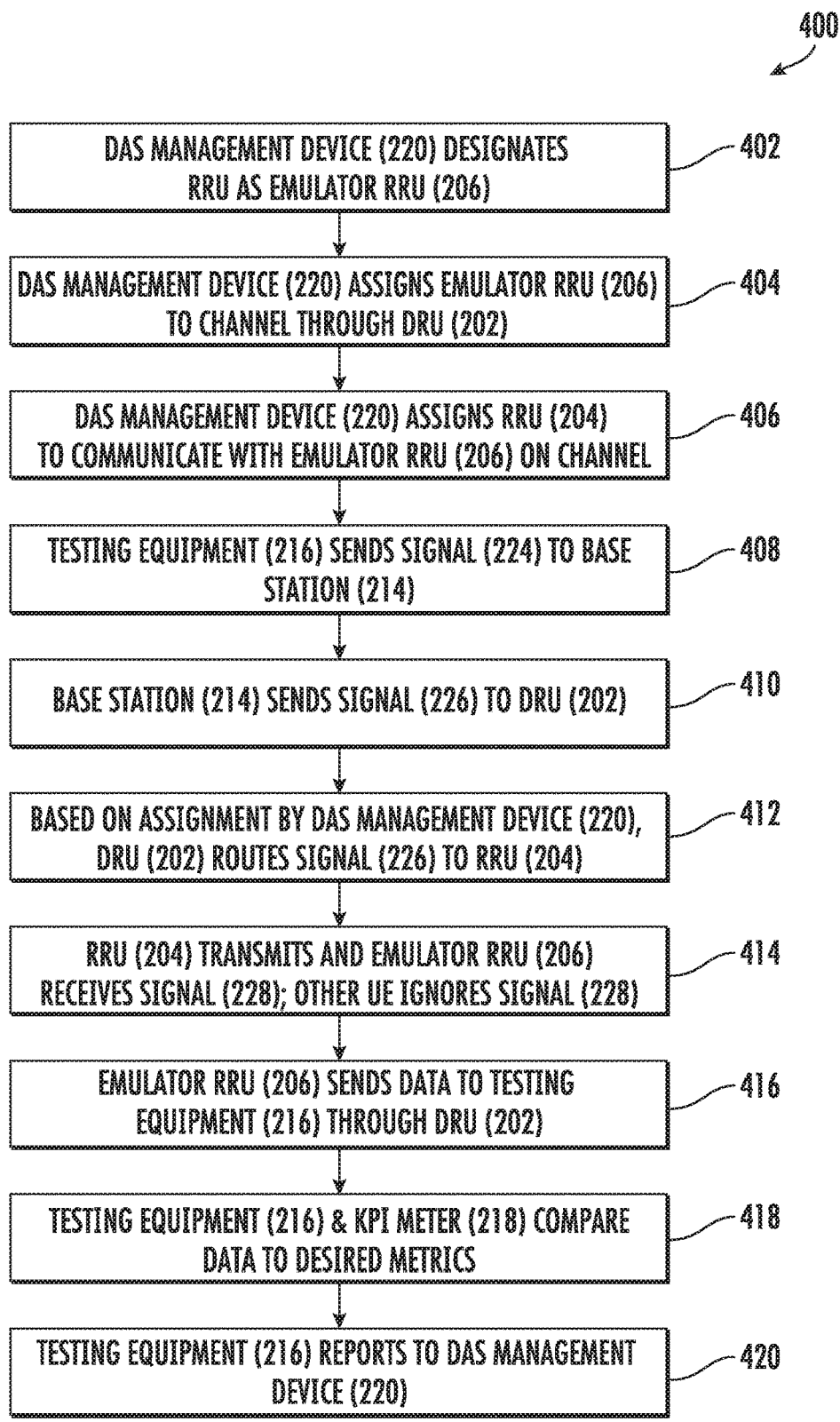
FIG. 4A and FIG. 4B are flowcharts illustrating processes associated with the systems of FIGS. 2 and 3, respectively.
Figure 4B:
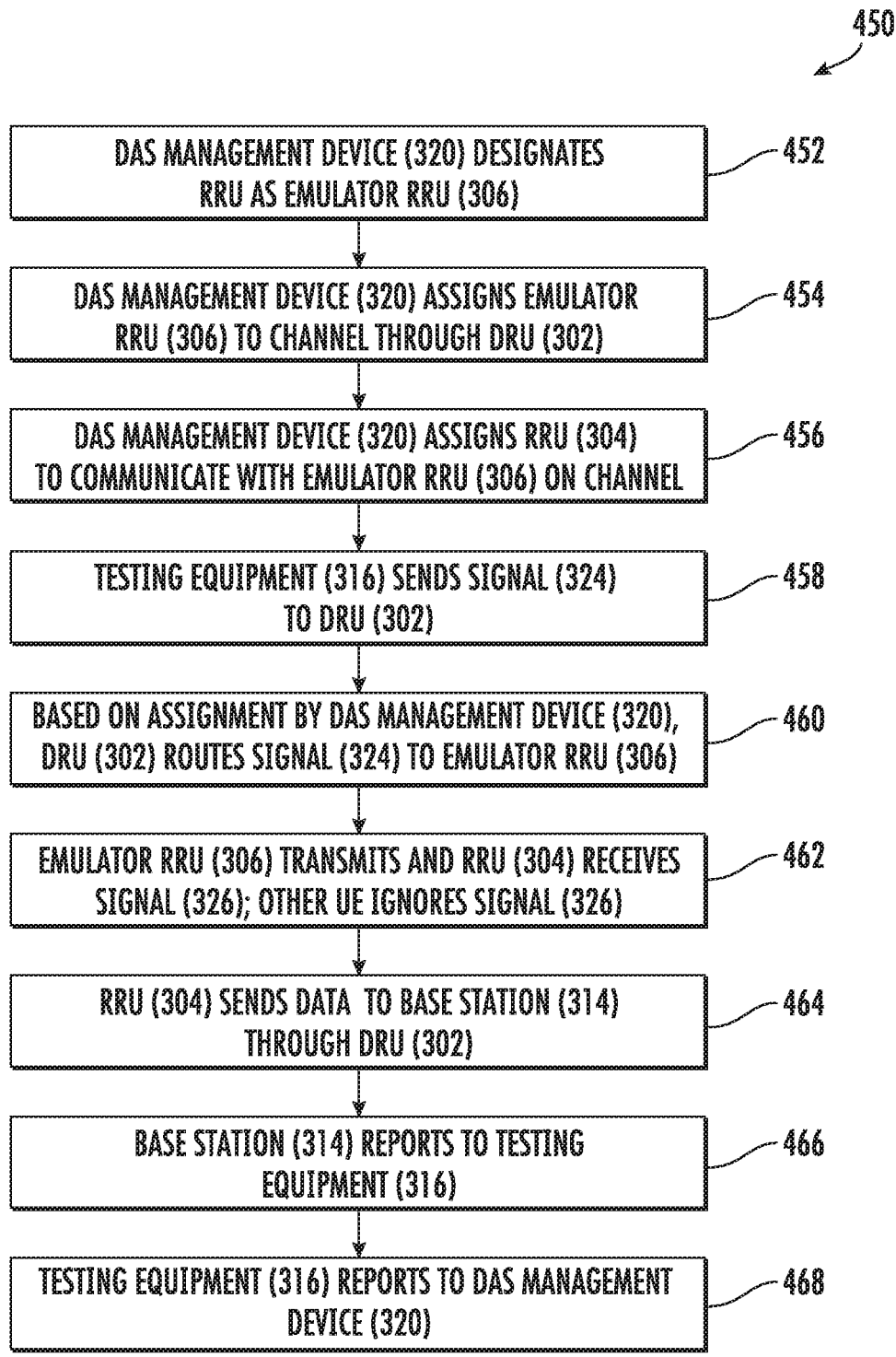

FIGS. 4A and 4B illustrate processes 400 and 450 corresponding to the system 200 and the system 300, respectively. Before the process 400 begins, some entity such as a building owner/operator decides that an updated performance test is needed. Rather than schedule a walk-through test, the entity causes the DAS management device 220 to activate the process 400. Alternatively the software 222 within the DAS management device 220 may periodically activate the process 400. Thus, the process 400 starts with the DAS management device 220 designating an RRU as the emulator RRU 206 (block 402). The DAS management device 220 assigns the emulator RRU 206 to a channel through the DRU 202 (block 404). The DAS management device 220 assigns the RRU 204 to communicate with the emulator RRU 206 on the channel through the DRU 202 (block 406). This assignment may exist in the DRU 202 through a channel management table or the like. For all practical purposes, the channel assignment looks to the DRU 202 as if user equipment was assigned to that channel and tasked with communicating through a specific RRU 204.

With continued reference to FIG. 4A, the testing equipment 216 sends the signal 224 to the base station 214 (block 408). The base station 214 sends the signal 226 to the DRU 202 (block 410). Based on the assignment by the DAS management device 220, the DRU 202 routes the signal 226 to the RRU 204 (block 412). The RRU 204 transmits and the emulator RRU 206 receives the signal 228 (block 414). Other user equipment in the cell ignores the signal 228 because the other user equipment is not assigned that channel. The emulator RRU 206 sends data to the testing equipment 216 through the DRU 202 (block 416). The testing equipment 216 and the KPI meter 218 compare the data to desired metrics (block 418) and report to the DAS management device 220 (block 420). From this data, the DAS management device 220 may provide indications of poor coverage or other information from which the system 200 may be updated.

Similarly, before the process 450 starts, some entity such as a building owner/operator decides that an updated performance test is needed. Rather than schedule a walk-through test, the entity causes the DAS management device 320 to activate the process 450. Alternatively the software 322 within the DAS management device 320 may periodically activate the process 450. Thus, the process 450 starts with the DAS management device 320 designating an RRU as the emulator RRU 306 (block 452). The DAS management device 320 assigns the emulator RRU 306 to a channel through the DRU 302 (block 454). The DAS management device 320 assigns the RRU 304 to communicate with the emulator RRU 306 on the channel through the DRU 302 (block 456). This assignment may exist in the DRU 302 through a channel management table or the like. For all practical purposes, the channel assignment looks to the DRU 302 as if user equipment was assigned to that channel and tasked with communicating through a specific RRU 304.

With continued reference to FIG. 4B, the testing equipment 316 sends the signal 324 to the DRU 302 (block 458). Based on the assignment by the DAS management device 320, the DRU 302 routes the signal 324 to the emulator RRU 306 (block 460). The emulator RRU 306 transmits and the RRU 304 receives the signal 326 (block 462). Other user equipment in the cell ignores the signal 326 because the other user equipment is not assigned that channel. The RRU 304 sends data to the base station 314 through the DRU 302 (block 464). The base station 314 reports to the testing equipment 316 (block 466). The testing equipment 316 and the KPI meter 318 compare the data to desired metrics and report to the DAS management device 320 (block 468). From this data, the DAS management device 320 may provide indications of poor coverage or other information from which the system 300 may be updated.

Figure 5:
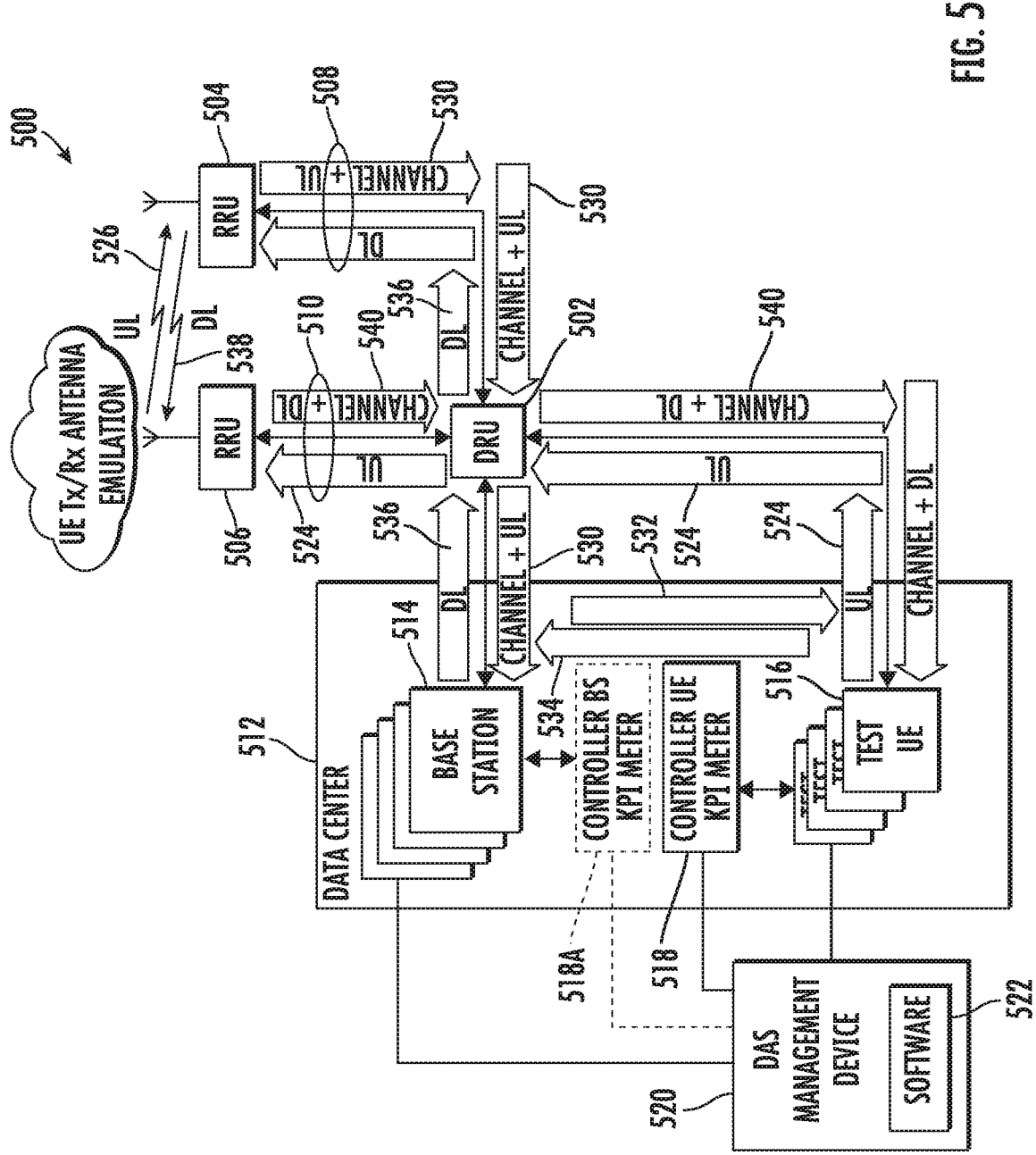
FIG. 5 is a simplified block diagram of a DAS doing uplink and downlink performance testing without requiring user equipment.

While the systems 200 and 300 are described as being only unidirectional testing, it should be appreciated that bidirectional testing is possible. In this regard, FIG. 5 illustrates a system 500 that allows concurrent bidirectional testing. In this regard, the system 500 includes a central unit, referred to herein as a DRU 502 coupled to an RRU 504 and an emulator RRU 506 through respective connective communication cables 508 and 510. The DRU 502 is communicatively coupled to a data center 512 that may include a base station 514 (or plural base stations), testing equipment 516 (or plural testing devices), and a KPI meter 518. A second KPI meter 518A may be present and associated with the base station 514. The KPI meter 518 and/or the testing equipment 516 may be communicatively coupled to a DAS management device 520 having software 522 thereon for managing aspects of the present disclosure. The DAS management device 520 may perform some or all of the same functions as the DAS management device 220 of FIG. 2. The DAS management device 520 may communicate with the base station(s) 514 and the testing equipment 516 as well as the KPI meter 518 (and/or KPI meter 518A). As part of these management and maintenance functions, appropriate control signals may be sent from the DAS management device 520 to the RRUs that are routed by the DRU 502.

With continued reference to FIG. 5, the DAS management device 520 causes the testing equipment 516 to send a signal 524 (also labeled UL in FIG. 5) to the DRU 502. The DRU 502 passes the signal 524 to the emulator RRU 506, which transmits the information in the uplink signal 524 wirelessly as signal 526 to the RRU 504. The RRU 504 reports channel measurements and the original uplink signal (collectively noted as signal 530 in FIG. 5) to the DRU 502. The DRU 502 passes the signal 530 to the base station 514, which may pass the contents of the signal to the testing equipment 516 (noted generally as signal 532). Alternatively, this data may be embedded in the downlink signal discussed below. The testing equipment 516 with the KPI meter 518 determines the effective strength of signal, error levels, and the like. Alternatively, the base station 514 may use the optional second KPI meter 518A to determine the effective strength of signal, error levels, and the like. In this latter case, the signal 532 may be the output from such determination (or again, it can be embedded in the downlink signal as discussed below).

Substantially concurrently, the DAS management device 520 causes the testing equipment 516 to send a signal 534 to the base station 514, which sends a downlink signal 536 to the DRU 502. Note that instead of responding to the signal 534, the downlink signal 536 may be generated in response to receipt of the signal 530 and include any information that was present in the signal 530 for eventual use by the testing equipment 516. The DRU 502 passes the downlink signal 536 to the RRU 504, which transmits the information in the downlink signal 536 wirelessly as signal 538 to the emulator RRU 506. The RRU 504 treats the emulator RRU 506 as user equipment in this regard. The emulator RRU 506 reports channel measurements and the original downlink signal (collectively noted as signal 540 in FIG. 5) to the DRU 502. The DRU 502 passes the signal 540 to the testing equipment 516, which may, with the KPI meter 518, determine the effective strength of signal, error levels, and the like. If the signal 540 includes the information from the signal 530, this additional information may be considered in determining signal strength, error levels, and the like.

In this manner, the emulator RRU 506 acts like user equipment to send and receive signals with at least one other RRU 504. It should be appreciated that multiple RRUs (not shown) may operate to send signals to the emulator RRU 506. Likewise, the RRU 504 and the emulator RRU 506 may switch roles with the RRU 504 acting as an emulator RRU, and the emulator RRU 506 acting to send downlink signals to the RRU 504. By rotating through which RRU within the system 500 is the emulator RRU 506, the entirety of the system 500 may be tested without having to perform a walk-through test. Such testing may allow the system 500 to be evaluated in view of changes to building topology or traffic patterns.

Note that instead of rotating through different RRUs and testing each one individually (i.e., one at a time), it is also possible that the testing may be done concurrently. For example, one RRU may be an emulator on one channel and a normal RRU interacting with a different emulator RRU on a second channel. Or a single emulator RRU may interact concurrently with multiple RRUs acting normally. Still further, an emulator RRU may interact with an RRU associated with a different system (e.g., perhaps in an adjacent building). The more data that can be acquired, the more informed evaluation can be made about the adequacy of a particular DAS installation. At some point, the additional information may be of such small incremental value as to be cumulative, but the present disclosure is scalable to include such additional sources of information, letting the designers determine at what point sufficient information has been collected to make a decision.

Figure 6:
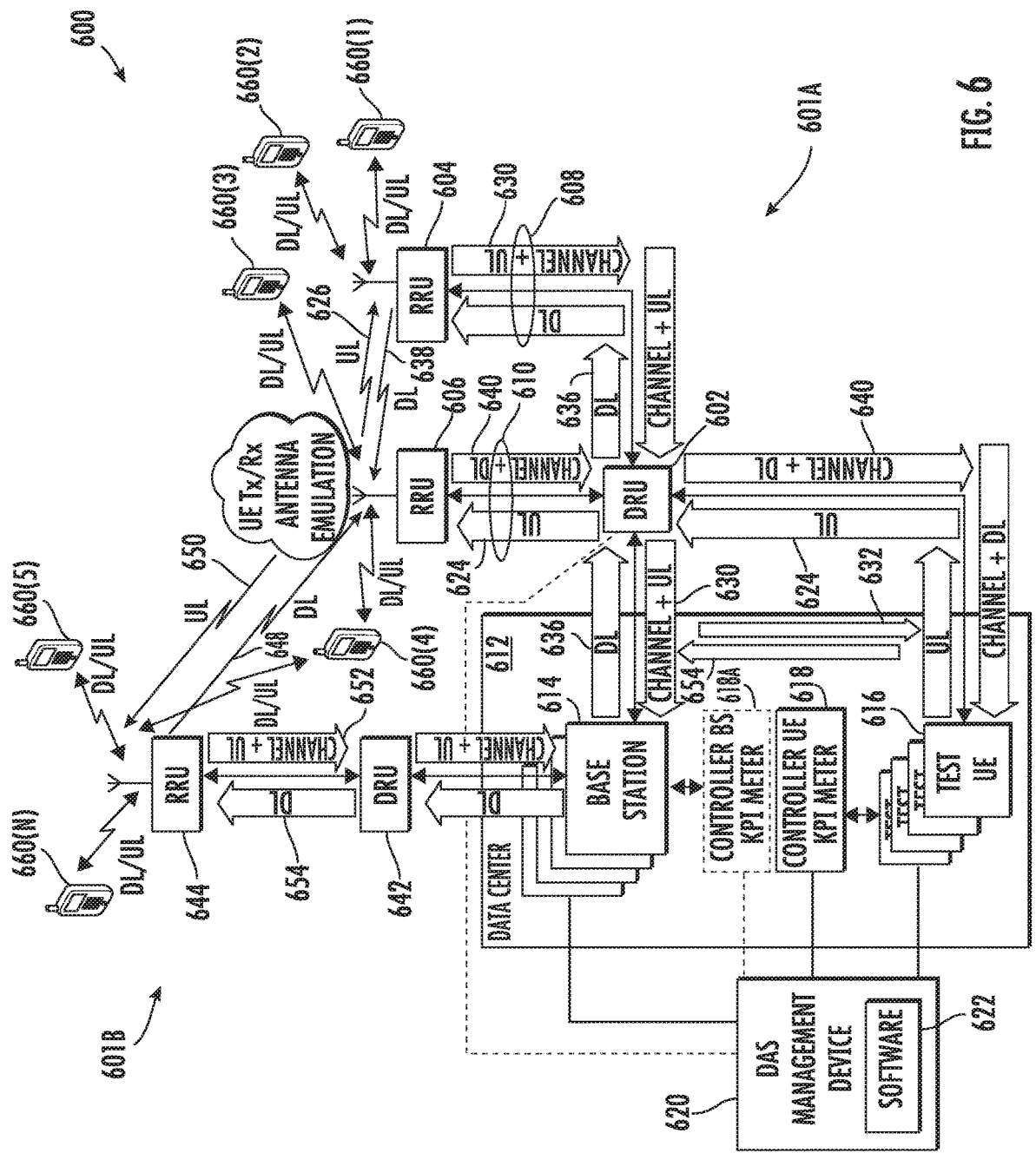
FIG. 6 is a simplified block diagram of a DAS doing uplink and downlink performance testing through multiple reporting remote radio units without requiring user equipment.

For the sake of illustration, FIG. 6 provides a simplified block diagram of one such possible situation, where an emulator RRU interacts with RRUs from multiple DASs. In this regard, FIG. 6 illustrates a system 600 which includes a first DAS 601A which is similar to the system 500 of FIG. 5. The first DAS 601A includes a central unit, referred to herein as a DRU 602 coupled to a first RRU 604 and an emulator RRU 606 through respective connective communication cables 608 and 610. The DRU 602 is communicatively coupled to a data center 612 that may include a base station 614 (or plural base stations), testing equipment 616 (or plural testing devices), and a KPI meter 618. A second KPI meter 618A may be present and associated with the base station 614. The KPI meter 618 and/or the testing equipment 616 may be communicatively coupled to a DAS management device 620 having software 622 thereon for managing aspects of the present disclosure. The DAS management device 620 may perform some or all of the same functions as the DAS management device 220 of FIG. 2. The DAS management device 620 may communicate with the base station(s) 614 and the testing equipment 616 as well as the KPI meter 618 (and/or KPI meter 618A). As part of these management and maintenance functions, appropriate control signals may be sent from the DAS management device 620 to the RRUs that are routed by the DRU 602.

With continued reference to FIG. 6, the DAS management device 620 causes the testing equipment 616 to send a signal 624 (also labeled UL in FIG. 6) to the DRU 602. The DRU 602 passes the signal 624 to the emulator RRU 606, which transmits the information in the uplink signal 624 wirelessly as signal 626 to the first RRU 604. The first RRU 604 reports channel measurements and the original uplink signal (collectively noted as signal 630 in FIG. 6) to the DRU 602. The DRU 602 passes the signal 630 to the base station 614, which may pass the contents of the signal 630 to the testing equipment 616 (noted generally as signal 632). Alternatively, this data may be embedded in the downlink signal discussed below. The testing equipment 616 with the KPI meter 618 determines the effective strength of signal, error levels, and the like. Alternatively, the base station 614 may use the optional second KPI meter 618A to determine the effective strength of signal, error levels, and the like. In this latter case, the signal 632 may be the output from such determination (or again, it can be embedded in the downlink signal as discussed below).

Substantially concurrently, the DAS management device 620 causes the testing equipment 616 to send a signal 634 to the base station 614, which sends a downlink signal 636 to the DRU 602. Note that instead of responding to the signal 634, the downlink signal 636 may be generated in response to receipt of the signal 630 and include any information that was present in the signal 630 for eventual use by the testing equipment 616. The DRU 602 passes the downlink signal 636 to the first RRU 604, which transmits the information in the downlink signal 636 wirelessly as signal 638 to the emulator RRU 606. The first RRU 604 treats the emulator RRU 606 as user equipment in this regard. The emulator RRU 606 reports channel measurements and the original downlink signal (collectively noted as signal 640 in FIG. 6) to the DRU 602. The DRU 602 passes the signal 640 to the testing equipment 616, which may, with the KPI meter 618, determine the effective strength of signal, error levels, and the like. If the signal 640 includes the information from the signal 630, this additional information may be considered in determining signal strength, error levels, and the like.

Additionally, the base station 614 communicates with a second DRU 642 in a second DAS 601B. The second DRU 642 communicates with a second RRU 644, which may likewise pass signals 648 to the emulator RRU 606 and receive signals 650 from the emulator RRU 606. The emulator RRU 606 may report the signals 648 to the testing equipment 616 through the signal 640. Likewise, the second RRU 644 may report the signals 650 to the base station 614 through a signal 652. Downlink signals 654 may be generated at the base station 614 responsive to the signal 652 or in response to the signal 634 from the testing equipment 616.

Note that in any of the systems 200, 300, 500, or 600, user equipment such as user equipment 660(1)-660(N) may be operational and may be used while the testing is being performed.

Figure 7:
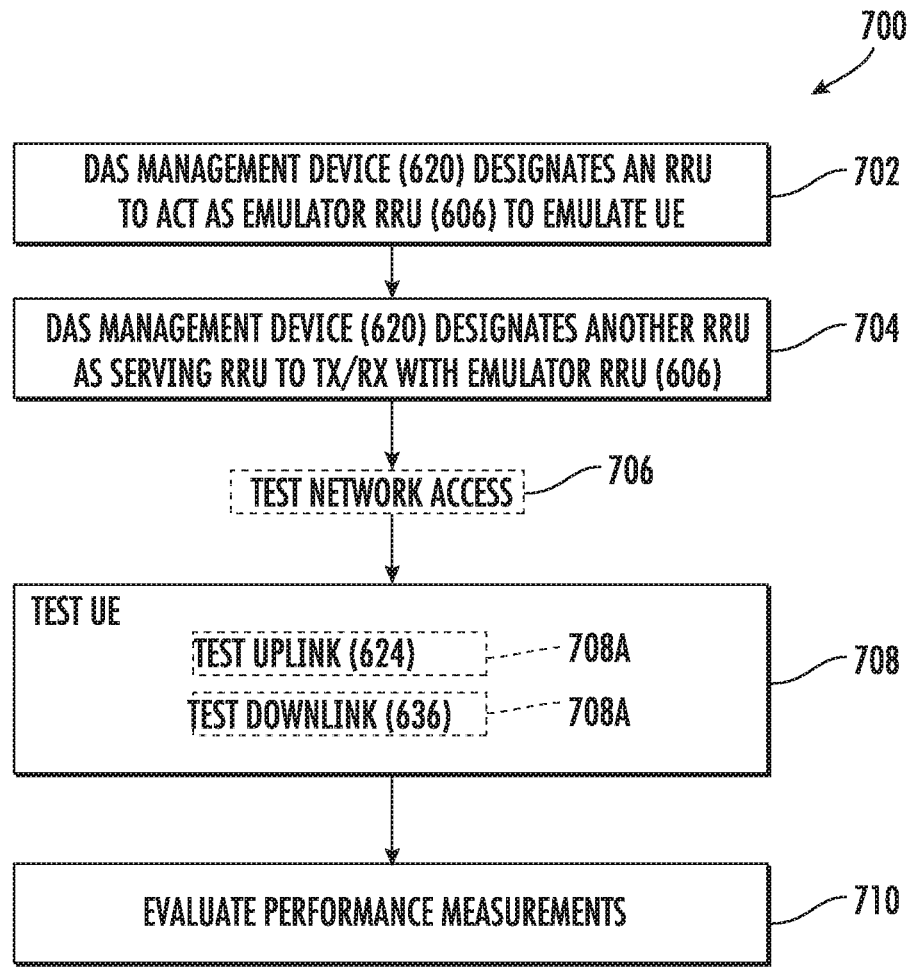
FIG. 7 is a flowchart illustrating a process of bidirectional testing of the DAS such as may be used in the systems of FIGS. 5 and 6.

A flowchart defining steps for implementing aspects of the present disclosure is provided with reference to FIG. 7. In this regard, process 700 begins with the DAS management device 620 designating an RRU to act as the emulator RRU 606 to emulate user equipment (block 702). The emulator RRU 606 should continue to be able to work as a regular RRU in parallel with the testing to be done. Further, the emulator RRU 606 could emulate multiple collocated user equipment by assigning multiple channels, with each channel simulating different user equipment. It should also be appreciated that multiple RRUs may be designated as emulator RRUs to emulate plural user equipment that are not collocated.

With continued reference to FIG. 7, the DAS management device 620 may designate another RRU as a serving RRU to transmit and receive with the emulator RRU 606 (block 704). This designation may be as simple as channel assignment and routing because the designated RRU will continue to work as a regular RRU. It should be appreciated that multiple RRUs may be designated as serving RRUs.

With continued reference to FIG. 7, the DAS management device 620 may instruct the testing of whether the emulated user equipment has network access (block 706). The DAS management device 620 then may instruct the system 600 to test the user equipment (block 708) such as by testing an uplink signal 624 (block 708A) and a downlink signal 636 (block 708B). Network parameters may be varied to simulate different conditions such as using different communication levels. The DAS management device 620 with the KPI meter 618 may then evaluate performance measurements (block 710). These measurements may include coverage, capacity, channel quality, and/or any additional KPI desired. The KPI meter 618 may, if connected to the base station 614, also provide such measurements from the base station side. A variety of scenarios may be emulated by using one or multiple emulator RRUs, collocated and not collocated, static or dynamically moving, simultaneous testing, and undependable testing. Likewise, multiple input, multiple output (MIMO) scenarios may be tested for both the uplink and the downlink by using multiple emulator RRUs and/or multiple serving RRUs per one test user equipment.

Figure 8:
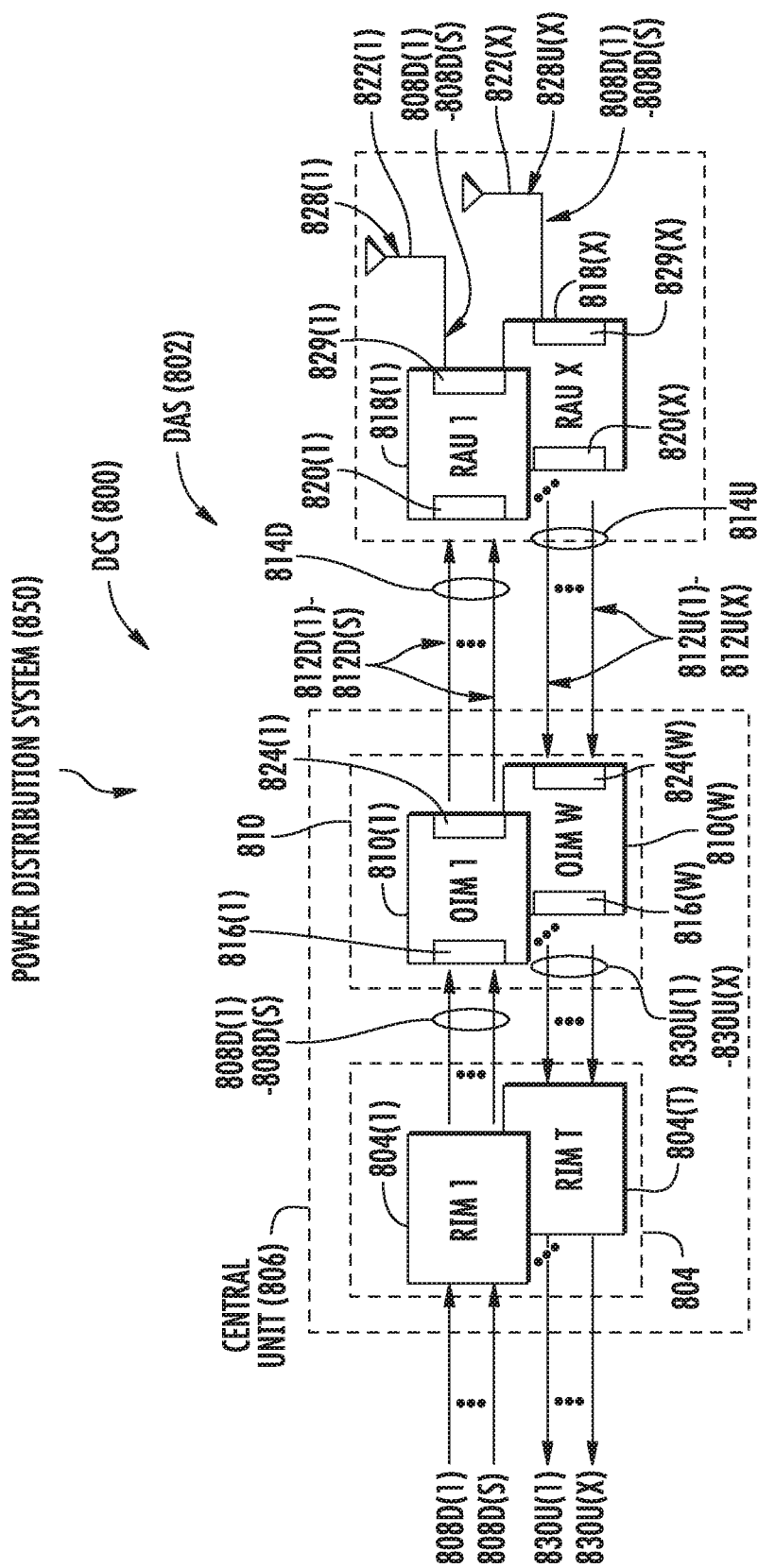
FIG. 8 is a schematic diagram of an exemplary optical fiber-based DCS in the form of a DAS configured to distribute communication signals between a central unit and a plurality of remote units, and that can incorporate performance testing according to the present disclosure.

In this regard, FIG. 8 is a schematic diagram of an exemplary DCS 800, which is a distributed antenna system (DAS) 802 in this example and may utilize the testing processes set forth herein. A DAS is a system that is configured to distribute communication signals, including wireless communication signals, from a central unit to a plurality of remote units over physical communication media, to then be distributed from the remote units wirelessly to client devices in wireless communication range of a remote unit. The DAS 802 in this example is an optical fiber-based DAS that is comprised of three (3) main components. One or more radio interface circuits provided in the form of radio interface modules (RIMs) 804(1)-804(T) are provided in a central unit 806 to receive and process downlink electrical communication signals 808D(1)-808D(S) prior to optical conversion into downlink optical communication signals. The downlink electrical communication signals 808D(1)-808D(S) may be received from a base transceiver station (BTS) or baseband unit (BBU) as examples. The downlink electrical communication signals 808D(1)-808D(S) may be analog signals or digital signals that can be sampled and processed as digital information. The RIMs 804(1)-804(T) provide both downlink and uplink interfaces for signal processing. The notations "1-S" and "1-T" indicate that any number of the referenced component, 1-S and 1-T, respectively, may be provided.

With continuing reference to FIG. 8, the central unit 806 is configured to accept the RIMs 804(1)-804(T) as modular components that can easily be installed and removed or replaced in a chassis. In one embodiment, the central unit 806 is configured to support up to twelve (12) RIMs 804(1)-804(12). Each RIM 804(1)-804(T) can be designed to support a particular type of radio source or range of radio sources (i.e., frequencies) to provide flexibility in configuring the central unit 806 and the DAS 802 to support the desired radio sources. For example, one RIM 804 may be configured to support the Personal Communication Services (PCS) radio band. Another RIM 804 may be configured to support the 700 MHz radio band. In this example, by inclusion of these RIMs 804, the central unit 806 could be configured to support and distribute communication signals, including those for the communication services and communication bands described above as examples.

The RIMs 804(1)-804(T) may be provided in the central unit 806 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the received downlink electrical communication signals 808D(1)-808D(S) are provided to a plurality of optical interfaces provided in the form of optical interface modules (OIMs) 810(1)-810(W) in this embodiment to convert the downlink electrical communication signals 808D(1)-808D(S) into downlink optical communication signals 812D(1)-812D(S). The notation "1-W" indicates that any number of the referenced component 1-W may be provided. The OIMs 810 may include one or more optical interface components (OICs) that contain electrical-to-optical (E-O) converters 816(1)-816(W) to convert the received downlink electrical communication signals 808D(1)-808D(S) into the downlink optical communication signals 812D(1)-812D(S). The OIMs 810 support the radio bands that can be provided by the RIMs 804, including the examples previously described above. The downlink optical communication signals 812D(1)-812D(S) are communicated over a downlink optical fiber communication link 814D to a plurality of remote units 818(1)-818(X) provided in the form of remote antenna units in this example. The notation "1-X" indicates that any number of the referenced component 1-X may be provided. One or more of the downlink optical communication signals 812D(1)-812D(S) can be distributed to each remote unit 818(1)-818(X). Thus, the distribution of the downlink optical communication signals 812D(1)-812D(S) from the central unit 806 to the remote units 818(1)-818(X) is in a point-to-multipoint configuration in this example.

With continuing reference to FIG. 8, the remote units 818(1)-818(X) include optical-to-electrical (O-E) converters 820(1)-820(X) configured to convert the one or more received downlink optical communication signals 812D(1)-812D(S) back into the downlink electrical communication signals 808D(1)-808D(S) to be wirelessly radiated through antennas 822(1)-222(X) in the remote units 818(1)-818(X) to user equipment (not shown) in the reception range of the antennas 822(1)-822(X). The OIMs 810 may also include O-E converters 824(1)-824(W) to convert received uplink optical communication signals 812U(1)-812U(X) from the remote units 818(1)-818(X) into uplink electrical communication signals 830U(1)-830U(X) as will be described in more detail below.

With continuing reference to FIG. 8, the remote units 818(1)-818(X) are also configured to receive uplink electrical communication signals 828U(1)-828U(X) received by the respective antennas 822(1)-822(X) from client devices in wireless communication range of the remote units 818(1)-818(X). The uplink electrical communication signals 828U(1)-828U(S) may be analog signals or digital signals that can be sampled and processed as digital information. The remote units 818(1)-818(X) include E-O converters 829(1)-829(X) to convert the received uplink electrical communication signals 828U(1)-828U(X) into uplink optical communication signals 812U(1)-812U(X). The remote units 818(1)-818(X) distribute the uplink optical communication signals 812U(1)-812U(X) over an uplink optical fiber communication link 814U to the OIMs 810(1)-810(W) in the central unit 806. The O-E converters 824(1)-824(W) convert the received uplink optical communication signals 812U(1)-812U(X) into uplink electrical communication signals 830U(1)-830U(X), which are processed by the RIMs 804(1)-804(T) and provided as the uplink electrical communication signals 830U(1)-830U(X) to a source transceiver such as a base transceiver station (BTS) or baseband unit (BBU).

Note that the downlink optical fiber communication link 814D and the uplink optical fiber communication link 814U coupled between the central unit 806 and the remote units 818(1)-818(X) may be a common optical fiber communication link, wherein for example, wave division multiplexing (WDM) may be employed to carry the downlink optical communication signals 812D(1)-812D(S) and the uplink optical communication signals 812U(1)-812U(X) on the same optical fiber communication link. Alternatively, the downlink optical fiber communication link 814D and the uplink optical fiber communication link 814U coupled between the central unit 806 and the remote units 818(1)-818(X) may be single, separate optical fiber communication links, wherein for example, wave division multiplexing (WDM) may be employed to carry the downlink optical communication signals 812D(1)-812D(S) on one common downlink optical fiber and the uplink optical communication signals 812U(1)-812U(X) may be carried on a separate, only uplink optical fiber. Alternatively, the downlink optical fiber communication link 814D and the uplink optical fiber communication link 814U coupled between the central unit 806 and the remote units 818(1)-818(X) may be separate optical fibers dedicated to and providing a separate communication link between the central unit 806 and each remote unit 818(1)-818(X).

Figure 9:
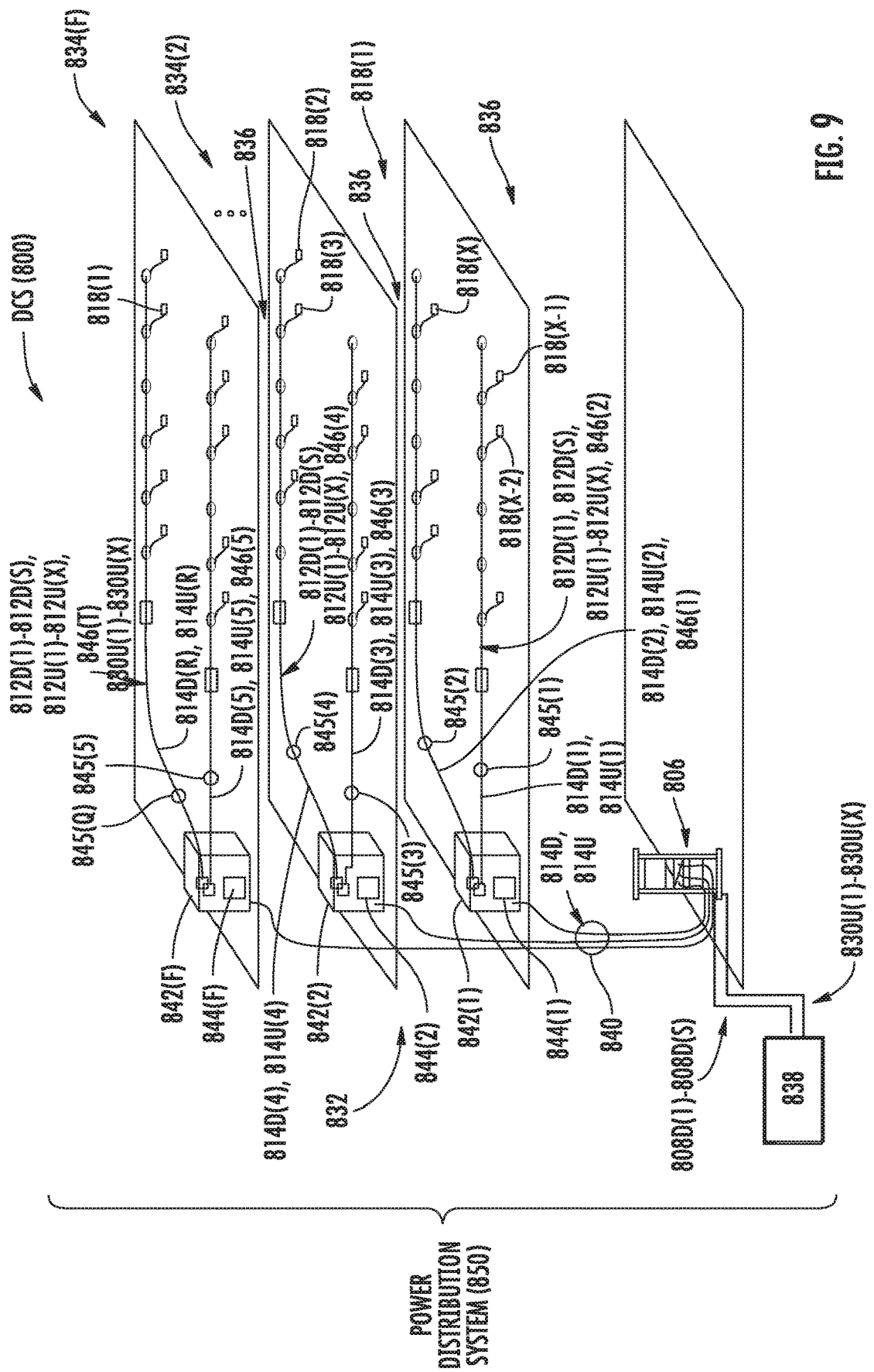
FIG. 9 is a partial schematic cut-away diagram of an exemplary building infrastructure in which the DCS in FIG. 8 can be provided.

The DCS 800 in FIG. 8 can be provided in an indoor environment as illustrated in FIG. 9. FIG. 9 is a partial schematic cut-away diagram of a building infrastructure 832 employing the DCS 800.

With reference to FIG. 9, the building infrastructure 832 in this embodiment includes a first (ground) floor 834(1), a second floor 834(2), and an Fth floor 834(F), where 'F' can represent any number of floors. The floors 834(1)-834(F) are serviced by the central unit 806 to provide antenna coverage areas 836 in the building infrastructure 832. The central unit 806 is communicatively coupled to a signal source 838, such as a BTS or BBU, to receive the downlink electrical communication signals 808D(1)-808D(S). The central unit 806 is communicatively coupled to the remote units 818(1)-818(X) to receive uplink optical communication signals 812U(1)-812U(X) from the remote units 818(1)-818(X) as previously described in FIG. 8. The downlink and uplink optical communication signals 812D(1)-812D(S), 812U(1)-812U(X) are distributed between the central unit 806 and the remote units 818(1)-818(X) over a riser cable 840 in this example. The riser cable 840 may be routed through interconnect units (ICUs) 842(1)-842(F) dedicated to each floor 834(1)-834(F) for routing the downlink and uplink optical communication signals 812D(1)-812D(S), 812U(1)-812U(X) to the remote units 818(1)-818(X). The ICUs 842(1)-842(F) may also include respective power distribution circuits 844(1)-844(F) that include power sources as part of the power distribution system 850, wherein the power distribution circuits 844(1)-844(F) are configured to distribute power remotely to the remote units 818(1)-818(X) to provide power for operating the power consuming components in the remote units 818(1)-818(X). For example, array cables 845(1)-845(Q) may be provided and coupled between the ICUs 842(1)-842(F) that contain both optical fibers to provide the respective downlink and uplink optical fiber communication links 814D(1)-814D(R), 814U(1)-814U(R) and power conductors 846(1)-846(T) (e.g., electrical wire) to carry current from the respective power distribution circuits 844(1)-844(F) to the remote units 818(1)-818(X).

Figure 10:
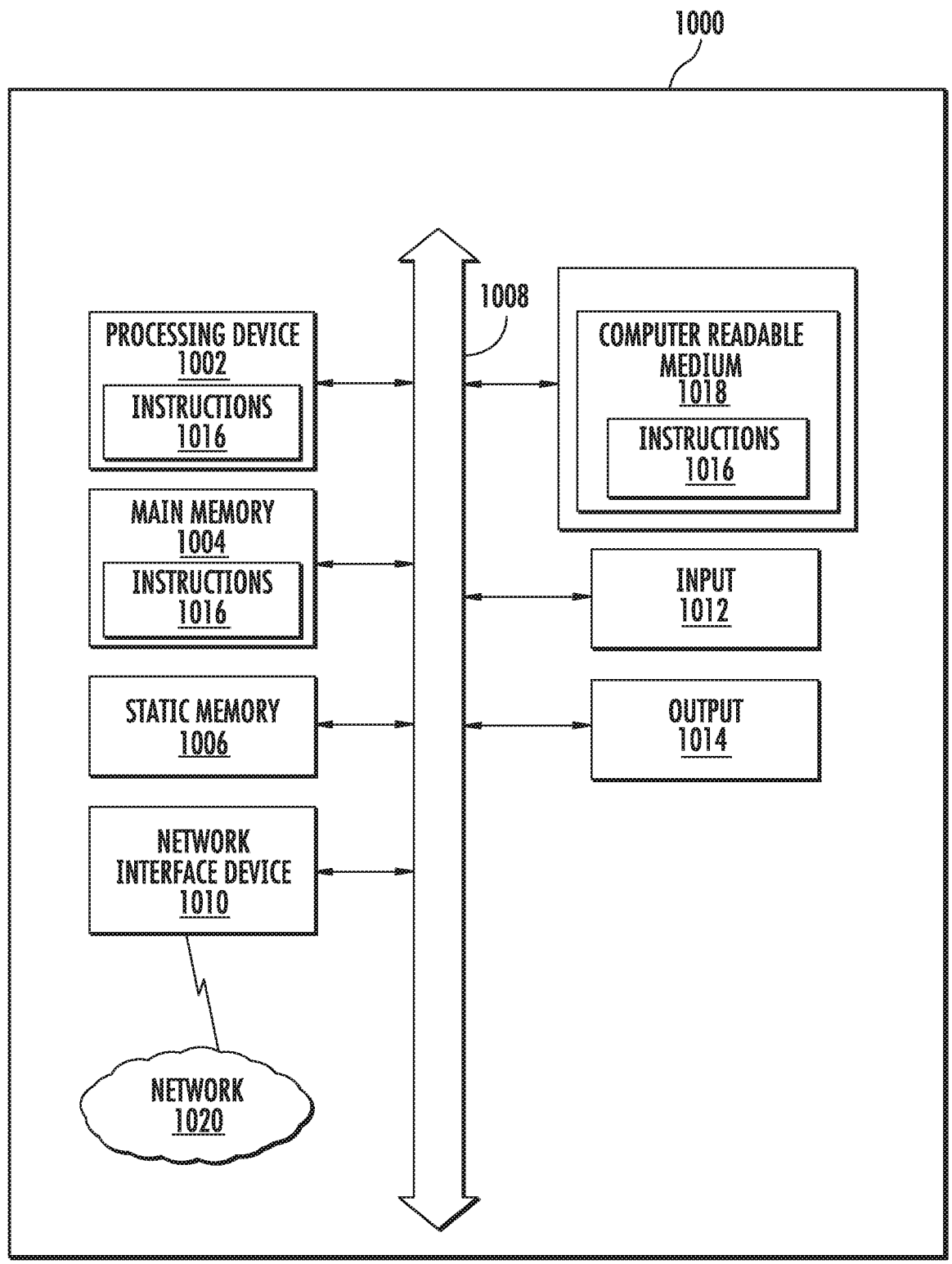
FIG. 10 is a schematic diagram of a generalized representation of an exemplary controller that can be included in any component in a DCS, including, but not limited to, the controller circuits used in the performance testing of the present disclosure, wherein an exemplary computer system is adapted to execute instructions from an exemplary computer-readable link.

FIG. 10 is a schematic diagram representation of additional detail illustrating a computer system 1000 that could be employed in any component in the DCS 800 of FIG. 9. In this regard, the computer system 1000 is adapted to execute instructions from an exemplary computer-readable medium to perform these and/or any of the functions or processing described herein.

In this regard, the computer system 1000 in FIG. 10 may include a set of instructions that may be executed to program and configure programmable digital signal processing circuits in a DCS for supporting scaling of supported communication services. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing device or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or static memory 1006 directly or via some other connectivity means. The processor 1002 may be a controller, and the main memory 1004 or static memory 1006 may be any type of memory.

The processor 1002 represents one or more general-purpose processing devices, such as a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of testing performance for a distributed communication system (DCS), comprising:
    designating a first remote radio unit (RRU) in the DCS as an emulator RRU;
    sending a signal through a second RRU to the emulator RRU;
    reporting information about the signal from the emulator RRU to a testing equipment;
    sending a second signal from the emulator RRU to the second RRU; and
    passing second information about the second signal from the second RRU to the testing equipment, wherein passing the second information comprises:
        passing the second information from the second RRU to a digital routing unit (DRU) before the information reaches the testing equipment;
        passing the second information from the DRU to a base station before the information reaches the testing equipment; and
        passing the second information from the base station to the testing equipment.

2. The method of claim 1, further comprising initiating the signal from the testing equipment to a base station prior to sending the signal.

3. The method of claim 2, further comprising passing the signal from the base station to a digital routing unit (DRU) prior to sending the signal.

4. The method of claim 3, further comprising passing the signal from the DRU to the second RRU.

5. The method of claim 1, wherein sending the signal through the second RRU to the emulator RRU comprises wirelessly sending the signal.

6. The method of claim 1, wherein reporting the information comprises passing the information to a digital routing unit (DRU) from the emulator RRU.

7. The method of claim 6, wherein reporting the information comprises passing the information from the DRU to the testing equipment.

8. The method of claim 1, further comprising positioning the second RRU in a distributed antenna system (DAS).

9. The method of claim 1, further comprising using the information to evaluate coverage adequacy of the DCS.

10. The method of claim 9, wherein using the information comprises evaluating at least one of coverage areas, signal strength, attach success rate by user equipment, link request success rate, voice over internet protocol (VOIP) initialization success rate, data call initialization success rate, fallback network success rate, call drop rate, handover success rate, mean user throughput, overall traffic, signal received power, signal received quality, and signal-to-noise ratio.

* * * * *